L. T. GROOTENHUIS.
REVOLVING SELF CLEANING SCREEN.
APPLICATION FILED FEB. 15, 1910.
969,364.
Patented Sept. 6, 1910.
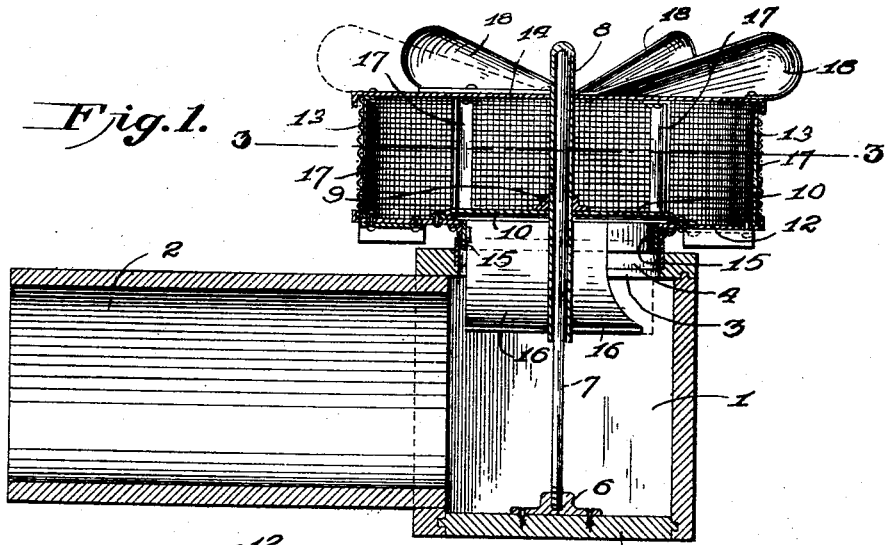
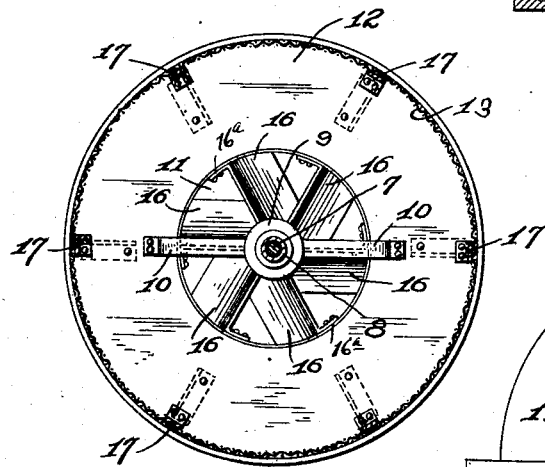
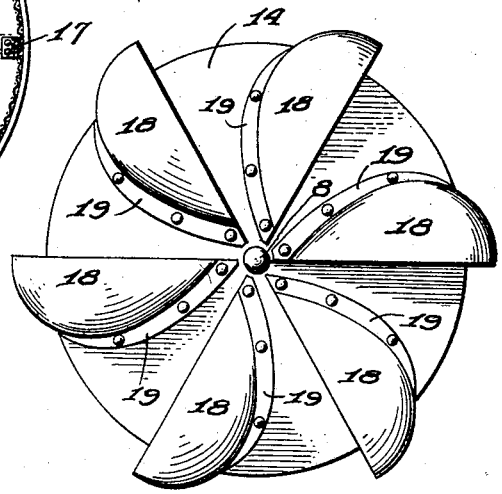
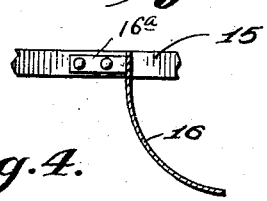
Inventor
Lewis T. Grootenhuis,
Witnesses

UNITED STATES PATENT OFFICE.

LEWIS T. GROOTENHUIS, OF BIGTIMBER, MONTANA.

REVOLVING SELF-CLEANING SCREEN.

969,364. Specification of Letters Patent. Patented Sept. 6, 1910.

Application filed February 15, 1910. Serial No. 544,064.

*To all whom it may concern:*

Be it known that I, LEWIS T. GROOTENHUIS, a citizen of the United States of America, residing at Bigtimber, in the county of Sweet Grass and State of Montana, have invented certain new and useful Improvements in Revolving Self-Cleaning Screens, of which the following is a specification, reference being had therein to the accompanying drawing.

This invention relates to screens for sluiceways, irrigation ditches and the like wherein it is desirable to have the water supply screened to remove leaves, twigs and the like therefrom, and the principal object of the same is to provide the screen with means whereby the leaves and the like that contact therewith are automatically removed from the screen.

In carrying out the object of the invention generally stated above it will be understood, of course, that the essential features thereof, are necessarily susceptible of changes in details and structural arrangements, one preferred and practical embodiment of which is shown in the accompanying drawings, wherein:—

Figure 1 is a central vertical sectional view of the intake of a sluiceway, showing the improved self cleaner in operative position thereon. Fig. 2 is a top plan view of the improved screen. Fig. 3 is a horizontal sectional view taken on the line 3—3, Fig. 1. Fig. 4 is a fragmentary view in elevation of the screening cylinder showing one of the pendent vanes carried thereby.

Referring to said drawings by numerals, 1 designates a box at the intake end of a sluiceway 2, said box having an opening 3 in its top that is provided with an upstanding flange collar 4. The bottom 5 of said box carries a central socket 6 on its inner surface which is threaded for the reception of the threaded end of a vertical shaft 7 that extends through and beyond the opening 3 and has its upper portion incased in a sleeve 8. Said sleeve 8 is rotatable on shaft 7 and is provided with a collar 9 to which the oppositely projecting supporting arms 10 are attached. The said arms 10 span a central opening 11 in the bottom 12 of a screening cylinder 13 whose sides are of meshed wire and whose top 14 is of sheet metal. The opening 11 is provided with a pendent flange 15 that projects into the flange collar 4 of box 1, and said flange 15 is provided with a plurality of downwardly curved pendent vanes 16 the top of which are arranged in radiating relation to sleeve 8, the lower portions of said vanes being in spaced overlapping relation as is shown in Fig. 3. Brace bars 17 are interposed between the top 14 and bottom 12 of the cylinder 13 for holding the same in spaced relation. The outer surface of the top 14 of cylinder 13 is provided with a plurality of buckets 18, said buckets being arranged in radiating relation and each having a flange 19 by means of which the buckets are riveted or otherwise rigidly attached to the top 14. Said buckets are of concaved formation and taper outwardly and upwardly, the outer ends projecting beyond the periphery of the cylinder 13, said outer ends being enlarged.

In operation, assuming the apparatus shown in Fig. 1 to be located in a flowing stream, it will be seen that some of the water will pass into the cylinder 13 and pass through opening 11 of the bottom 12 and striking against pendent vanes 16 will impart a rotary movement to cylinder 13. Similarly the force of the flowing water will contact with buckets 18 with sufficient pressure to rotate cylinder 13, the foreign matter caught by the buckets which face the flowing water being obviously released when they are rotated to an opposite position, and as the cylinder is being constantly rotated, it will be seen that said cylinder also releases all foreign matter that its sides catch when facing upstream.

It will therefore be seen that the present invention provides means whereby a constant rotation of the screening cylinder is assured through the employment of the upper buckets which rotate the cylinder by the force of the flowing stream, such rotation being assisted by the pendent vanes 16 to which rotation is imparted by means of the screened water that is delivered to the intake of the sluice, irrigation ditch, or the like. The vanes 16 are each provided with a right angularly projecting attaching lug 16$^a$ which projects at one upper corner thereof, and which is fastened to the inner surface of collar 15 by the bolts, rivets, or the like. Preferably said lugs are integral with the vanes.

What I claim as my invention is:—

1. A device of the character described comprising a stationary shaft, a screening cylinder rotatable thereon, buckets arranged in radiating relation on the top of said cylinder and adapted to rotate said cylinder, and pendent vanes carried by the bottom of said cylinder and adapted to receive rotary movement from the force of the water that passes through said cylinder.

2. A device of the character described comprising a shaft, a screening cylinder rotatable thereon and provided with an opening in its bottom, buckets on the top of said cylinder for imparting rotation thereto, and vanes projecting from the edge of the opening in the bottom of said cylinder and receiving rotary power from the water that passes through said opening.

3. A screening device for the intake of water ways comprising a cylinder having wire mesh sides, a closed top, and a bottom provided with a central opening, a shaft upon which said cylinder is rotatably mounted, means carried by the top of said cylinder and receiving rotary power from the water that flows over the same, and means projecting from the opening in the bottom of said cylinder which receives rotary power from the water that passes through said cylinder.

4. A screening device comprising a cylinder having an opening in its bottom, a support upon which said cylinder is rotatably mounted, buckets carried by the outer surface of the top of said cylinder, and vanes depending from the opening in the bottom of said cylinder.

5. A self cleaning screen comprising a rotatably mounted screening cylinder adapted to be submerged in flowing streams, buckets carried by the top of said cylinder and receiving rotary force from the flowing stream, and means projecting from the bottom of said cylinder which receive rotary force from the water that flows through said screen.

6. A screening device comprising a cylinder having a sheet metal top, a bottom provided with a central opening and a wire mesh body, a support upon which said cylinder is rotatably mounted, a collar depending from the edge of the opening in the bottom of the cylinder, and a plurality of vanes depending from said collar and arranged in spaced overlapping relation.

7. In a device of the character described the combination with an intake box of a water way provided with an opening in its top, said opening being equipped with an upstanding collar, of a shaft stationary in said box and projecting through the open top thereof, a screening cylinder rotatably mounted on said shaft and provided with an opening in its bottom for delivering to said box, a collar carried by said bottom and surrounding the opening therein, said collar being fitted to the upstanding flange of said box, and means for rotating said cylinder.

In testimony whereof I hereunto affix my signature in presence of two witnesses.

LEWIS T. GROOTENHUIS.

Witnesses:
HARRY C. ALLEN,
BERNARD J. KLEINHESSELINK.